Patented Sept. 1, 1925.

1,551,881

UNITED STATES PATENT OFFICE.

GUY C. HOWARD, OF SEATTLE, WASHINGTON.

PROCESS OF RECOVERING TANNIN.

No Drawing.    Application filed December 29, 1921.  Serial No. 525,763.

*To all whom it may concern:*

Be it known that I, GUY C. HOWARD, a citizen of the United States, and resident of the city of Seattle, in the county of King and State of Washington, have invented certain new and useful Improvements in a Process of Recovering Tannin, of which the following is a specification.

The specific object of my invention is to provide an improved process of recovering tannin from bark wherein the tannin is separated from the bark while in a dry state. In more general terms the object is to provide an improved process of separating and recovering water soluble constituents from materials containing cellulose while in a dry state.

The tannin contained in bark is an amorphous material, soluble in water or at least is peptized by water to a colloidal solution. It resides in the bark ducts, interstices, or bark cells and in the process of drying tends to move with the outgoing moisture to an exposed surface of the bark where the water is vaporized leaving a dry amorphous deposit on the bark particles. If the bark is reduced by grinding to substantially individual cell or fibre elements and is simultaneously completely dried the maximum concentration of the tannin on the surface of such bark particles is effected.

When the bark is in an "air dry" condition the moisture therein, depending on the humidity of the surrounding atmosphere, will tend to retain the tannin on the surfaces of the bark particles. If dried to a "bone dry" state this tendency to retain the tannin on the surface is avoided and on the contrary it can be dusted from the bark particles with comparative facility and can be separated and collected in a suitable form for shipment and commercial use.

The process in which my invention consists may be described as follows and specifically as regards the recovery of tannin from bark.

The tan bark is first brought to a substantially "air dry" condition. This is preferably accomplished by a coarse shredding of the bark followed by a drying process in any suitable equipment. If "cured" or "seasoned" bark is used this drying operation is unnecessary. The air dry bark is then given a further suitable grinding treatment whereby it is reduced to substantially individual cell or fibre units. This result is preferably accomplished with the bark in an air dry state but in practice such grinding treatment may be carried on in the presence of a mild drying current of air with its resultant further drying action. Some fine dust will develop in this comminuting treatment and will be collected as a tannin product. Incidentally provision may be made in connection with this step of the grinding treatment to remove and collect the cork cell aggregates existing in certain barks, as described in my prior patent application, Serial Number 514,209.

The bark material thus reduced is then subjected to a further drying treatment to bring it to a bone dry condition. This is accomplished in any suitable drying equipment wherein the material is agitated in contact with a drying current of air. Thus the remaining moisture in the bark material is drawn to the surface with its tannin content and as the moisture is evaporated the fine tannin solids are either expelled from the surfaces by the relatively violent expansive action in the vaporization of the water or are left on the dry surfaces of the bark particles wherefrom they are dislodged by the agitation of the material and the friction of the particles upon each other while in a bone dry condition. Such agitation treatment of the bark material in the presence of a drying current of air is continued until an economically thorough separation and removal of the tannin content of the bark is accomplished.

Carrying the drying treatment of the material to a bone dry state is essential to a complete separation of the tannin solids from the particles since the tannin will adhere less readily to a dry surface than to a moist one. The removal of such separated tannin solids by or in the presence of a drying current of air is essential to the process because of the extreme fineness of said tannin materials.

The separated tannin product is then collected by any suitable means from the carrying current of air and preferably is restored to at least an air dry condition of moisture content.

The above description of my invention has been made with reference to its application to tan bark but is not limited thereto for it may be advantageously applied to the recovery of tannin from wood as well as the recovery of water soluble non-tannins from either bark, wood or other materials containing cellulose. The factors affecting its economic application are that the water soluble element to be recovered shall be of a character when dry that admits of its being removed as a dust or powder and that the parent material can be comminuted to substantially individual cell or fibre elements or at least to suitably small particles.

The process herein described has many advantages among which are the high quality of the tannin product obtained, and the relatively low plant investment and production cost per unit of tannin recovered.

Having described my invention, what I claim, is—

1. A process of recovering water soluble constituents from materials containing cellulose, consisting in separating and collecting said constituents from the parent material while all is in a dry condition.

2. A process of recovering tannin from materials containing cellulose, consisting in separating and collecting the tannin content from the parent material while all is in a dry condition.

3. A process of recovering tannin from materials containing cellulose, consisting in drying the material, and separating the tannin from the parent material as a dust and collecting said dust.

4. A process of recovering tannin from materials containing cellulose, consisting in reducing the material to small particles, removing the moisture from said particles, and separating the tannin from the surfaces of said particles.

5. A process of recovering tannin from materials containing cellulose, consisting in reducing the material to small particles, drying said particles to a bone dry condition, and simultaneously separating the solid deposits formed on said particles.

6. A process of recovering tannin from materials containing cellulose, consisting in reducing the material to small particles, drying said particles, removing the tannin deposit formed on said particles, and collecting the tannin thus removed.

7. A process of recovering tannin from materials containing cellulose, consisting in reducing the material to small particles, drawing the moisture to the surfaces of said particles, and separating the tannin deposit formed on the surfaces of said particles by the evaporation of said moisture.

8. A process of recovering tannin from materials containing cellulose, consisting in reducing the material to small particles, drying said particles to a bone dry condition, separating and removing the tannin in the form of dust from said particles, and collecting said tannin dust.

9. A process of recovering tannin from materials containing cellulose, consisting in reducing the material to small particles in an air dry condition, then drying said particles to a substantially moisture free condition and simultaneously separating the tannin dust from the surfaces of said particles, and collecting the tannin dust thus removed from the material.

10. A process of recovering tannin from materials containing cellulose, consisting in reducing the material to small particles in a substantially air dry condition, drawing the tannin to the surfaces of said particles by further drying to remove all moisture, separating the tannin dust from said surfaces by agitation and friction in the presence of a drying current of air, and collecting the tannin dust removed from the material.

11. A process of recovering water-soluble constituents from materials containing cellulose, consisting in reducing the material to suitably small particles, drying said particles to a substantially moisture free condition, separating and removing said constituents by agitation and abrasion while in such dry condition and in the presence of a drying current of air, and finally collecting said removed constituents.

Signed at Seattle, Washington, this 20th day of December, 1921.

GUY C. HOWARD.